US007603359B2

(12) United States Patent
Bhogal et al.

(10) Patent No.: US 7,603,359 B2
(45) Date of Patent: Oct. 13, 2009

(54) METHOD AND APPARATUS FOR MAINTAINING FEDERATED NAME CONTEXT BINDINGS IN A NAME SPACE

(75) Inventors: Kulvir S. Bhogal, Fort Worth, TX (US); William M. Edwards, Pflugerville, TX (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 11/333,604

(22) Filed: Jan. 17, 2006

(65) Prior Publication Data

US 2007/0168371 A1 Jul. 19, 2007

(51) Int. Cl.
*G06F 7/00* (2006.01)
(52) U.S. Cl. .............................. 707/10; 707/4; 707/202; 707/205; 709/217; 709/219; 709/316
(58) Field of Classification Search .................. 707/1–2, 707/4–7, 10, 202, 205; 709/217–219, 316
See application file for complete search history.

(56) References Cited

U.S. PATENT DOCUMENTS

| 5,465,365 | A | * | 11/1995 | Winterbottom | ............... | 707/101 |
| 5,689,701 | A |   | 11/1997 | Ault et al. | | |
| 5,903,753 | A | * | 5/1999 | Bramnick et al. | ............... | 719/328 |
| 6,083,282 | A |   | 7/2000 | Caron et al. | | |
| 6,098,111 | A |   | 8/2000 | Maegawa et al. | | |
| 6,167,253 | A |   | 12/2000 | Farris et al. | | |
| 6,269,378 | B1 | * | 7/2001 | Quirt | ............... | 707/103 R |
| 6,438,590 | B1 | * | 8/2002 | Gartner et al. | ............... | 709/219 |
| 6,578,050 | B1 | * | 6/2003 | Daggubati et al. | ............... | 707/104.1 |
| 6,604,148 | B1 |   | 8/2003 | Dennison | | |
| 6,633,923 | B1 | * | 10/2003 | Kukura et al. | ............... | 719/316 |
| 6,751,646 | B1 | * | 6/2004 | Chow et al. | ............... | 718/105 |
| 6,769,001 | B2 |   | 7/2004 | Halstead, Jr. et al. | | |
| 6,834,284 | B2 | * | 12/2004 | Acker et al. | ............... | 707/103 R |

(Continued)

FOREIGN PATENT DOCUMENTS

| EP | 0738970 A1 | 10/1996 |
| WO | WO 03/073209 A2 | 9/2003 |

OTHER PUBLICATIONS

"Name space Models for Locating Services"—Nigel Hinds and C. V. Revishankar—IBM Canada laboratory technical Report 74.074 Oct. 1991 CASCON'91 (pp. 299-321).*

(Continued)

*Primary Examiner*—Jean B. Fleurantin
*Assistant Examiner*—Anh Ly
(74) *Attorney, Agent, or Firm*—Dillon & Yudell LLP

(57) ABSTRACT

A method, system and computer program product for maintaining federated name context bindings in a name space is disclosed. A reference within a first name space of a first system is bound with a durable subscription to a second name space on a second system. The binding of the first reference to the second name space is administered with a graphical user interface. A durable subscription is established with the second system for the binding utilizing communication with the second system over a network. Notification of a change affecting the bindings from the second system is received and the reference is rebound in the first name space.

16 Claims, 8 Drawing Sheets

U.S. PATENT DOCUMENTS

| | | | |
|---|---|---|---|
| 2002/0095479 | A1 | 7/2002 | Schmidt |
| 2002/0147696 | A1* | 10/2002 | Acker et al. .................. 707/1 |
| 2003/0074484 | A1* | 4/2003 | Cheng et al. ............... 709/316 |
| 2003/0078943 | A1 | 4/2003 | McGeorge, Jr. |
| 2006/0069723 | A1* | 3/2006 | Ferwerda et al. ........... 709/203 |
| 2007/0050320 | A1* | 3/2007 | Carrier ......................... 707/1 |

OTHER PUBLICATIONS

"A Fault-Tolerant CORBA Name Server"—Silvano Maffeis—IEEE 1996 (pp. 188-197).*

"Distributed Object Technologies for Element Management System"—Mousa AL-Mohammed-Helsinki University of Technology—Espoo, Sep. 10, 2003 (pp. 1-89).*

"Exploring the Relationship between FOHM and RDF"—Gibbins et al. 2003,—1$^{st}$ Internatic Workshop on Hypermedia and the Semantic Web, Jul. 28, 2003, Nottingham, UK (pp. 1-13).*

Knutson et al., Legacy CORBA Name Space Integration Using Web Application Servers, IBM Dossier AUS920010685.

* cited by examiner

METHOD AND APPARATUS FOR MAINTAINING FEDERATED NAME CONTEXT BINDINGS IN A NAME SPACE

BACKGROUND OF THE INVENTION

1. Technical Field

The present invention relates in general to network communications and in particular to addressing systems used by a data processing system. Still more particularly, the present invention relates to a system, method and computer program product for maintaining federated name context bindings in a name space.

2. Description of the Related Art

The Internet, also referred to as an "internetwork", is a set of computer networks, possibly dissimilar, joined together by means of gateways that handle data transfer and the conversion of messages from a protocol used by the sending network to a protocol used by the receiving network. When capitalized, the term "Internet" refers to the worldwide collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretariats of state. Additionally, providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet protocols exist for transferring information, such as File Transfer Protocol (FTP) and Gopher, but have not achieved the popularity of the Web. In a Web environment, servers and clients effect data transaction using the Hypertext Transfer Protocol (HTTP), a commonly-known protocol for handling the transfer of various data files (e.g., text, still graphic images, audio, motion video, etc.).

Websites are hosted on server data processing systems. Often more than one server data processing system supports transactions or requests directed to a single website. In other words, for a particular URL to a given website, more than one server data processing system is available to handle requests from users on the Web. These server data processing systems are often organized onto a grouping referred to as a cluster or server cluster. A cluster is a group of server data processing systems that provides fault tolerance and/or load balancing. If one server data processing system in the cluster fails, one or more additional server data processing systems are still available. Load balancing distributes the workload over multiple data processing system in the cluster.

These server data processing systems run applications used to handle requests. For example, the applications for a website may include applications used to provide information about goods and services, provide a shopping cart, and process orders. In order to facilitate multi-server transactions that involve data transfer between systems over a network, it is necessary to maintain a database of correct addresses for other systems located on a network. Such a database is called a name space. In the prior art, adequate solutions do not exist for the problem of maintaining usable 'federated' naming context references, which are naming context references linked to addresses on foreign systems. A federated name space is a name space employing such references. For example, if a first name space on a first system has a federated naming context binding which resolves to a naming context in a second name space, that reference might become invalid if the name server which hosts the second name space is restarted.

What is needed is a method for maintaining federated name context bindings in a name space.

SUMMARY OF THE INVENTION

A method, system and computer program product for maintaining federated name context bindings in a name space are disclosed. A reference within a first name space of a first system is bound with a durable subscription to a second name space on a second system. The binding of the first reference to the second name space is administered with a graphical user interface. A durable subscription is established with the second system for the binding utilizing communication with the second system over a network. Notification of a change affecting the bindings from the second system is received and the reference is rebound in the first name space.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention provides a method, system, and computer program product for maintaining federated name context bindings in a name space. This invention is used to maintain federated naming context bindings in a "local" name space. The local name space is part of a hosting system being administered. Federated naming context bindings are bindings in the name space that resolve to naming contexts in other name spaces.

The present invention solves the problem of maintaining usable naming context references. For example, if a first exemplary name space (Name Space A) has a federated naming context binding which resolves to a naming context in a second exemplary name space (Name Space B) that reference might become invalid if the name server which hosts Name Space B is restarted. A reference becomes invalid on system restart, because of static or dynamic changes to identification of resources, their paths, addresses and or names. The present invention solves this problem by obtaining a fresh reference to the naming context in Name Space B and rebinding it into Name Space A. The present invention allows the systems hosting Name Space A and Name Space B to cooperate through a common publish/subscribe mechanism (called a subscription server). Name Space A in the foregoing example is the name space being administered. In order to maintain valid references to Name Space B within Name Space A, the system hosting Name Space A subscribes to Name Space B. The present invention provides mechanisms to facilitate that subscription.

As a subscriber, the system hosting Name Space A is notified of certain events, including when Name Space B is started or restarted. Event notification allows the system hosting Name Space A to rebind all references into Name Space B. If the publishing system hosted on Name Space B is given detailed information about exactly which naming contexts in Name Space B are referenced from Name Space A, the publishing system in Name Space B can send notifications if the status of any of those particular naming contexts in Name Space B change. Such a situation could arise if a naming context in Name Space B is rebound or unbound.

Because the system hosting Name Space B might not be available when Name Space A's hosting system is started, the present invention provides a means for Name Space A's subscription to be made persistent. Once Name Space A is subscribed, it will be notified that Name Space B has been started or restarted until Name Space A unsubscribes. This condition will always occur if Name Space B contains references to Name Space A, creating a circular dependency. One of the systems will almost always be available before the other.

Figures 1, 1A, 1B:
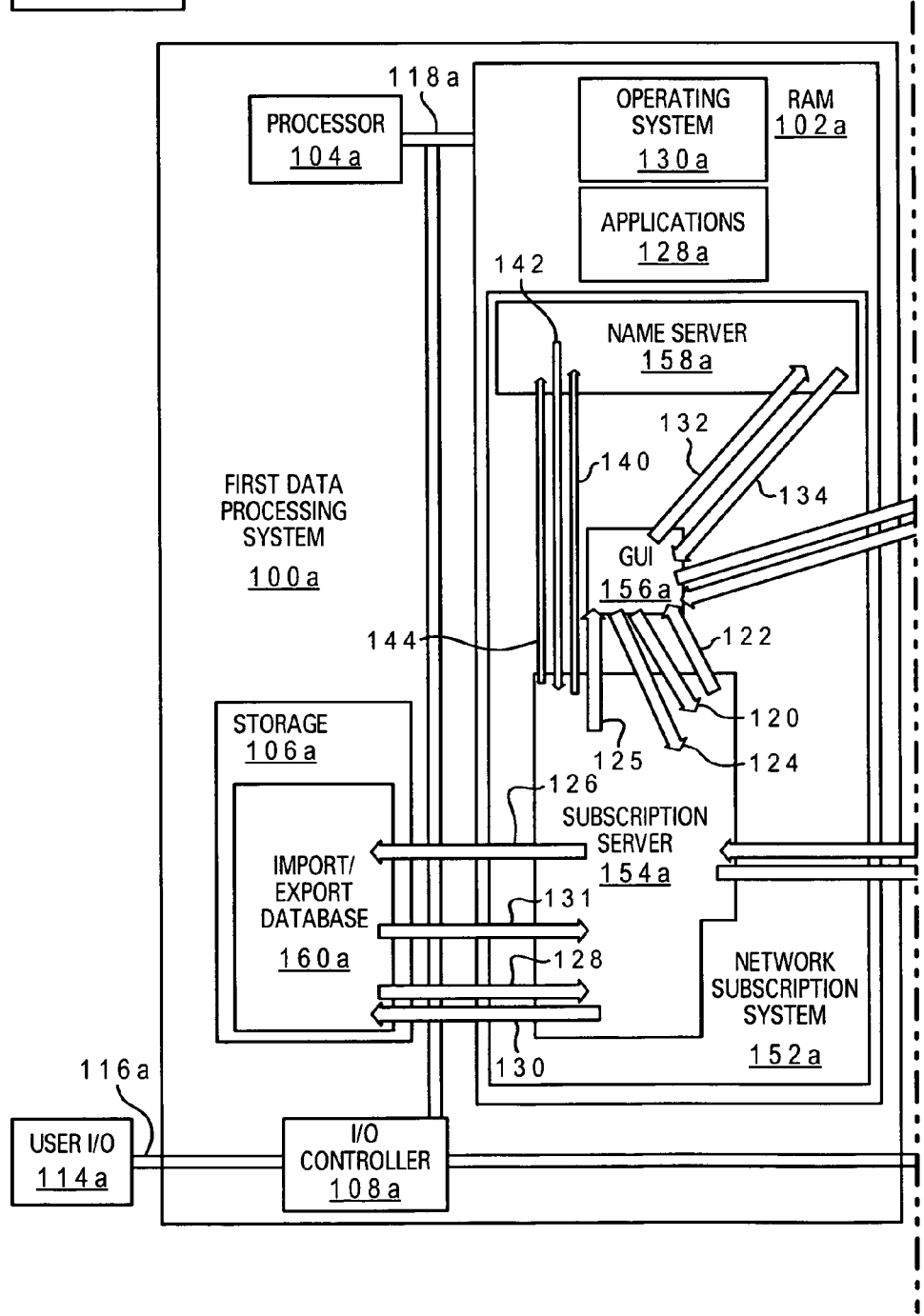
FIG. 1 depicts a block diagram of a network environment containing general-purpose data processing systems with which the present invention of a method, system and computer program product for maintaining federated name context bindings in a name space may be performed.
Figure 1B:
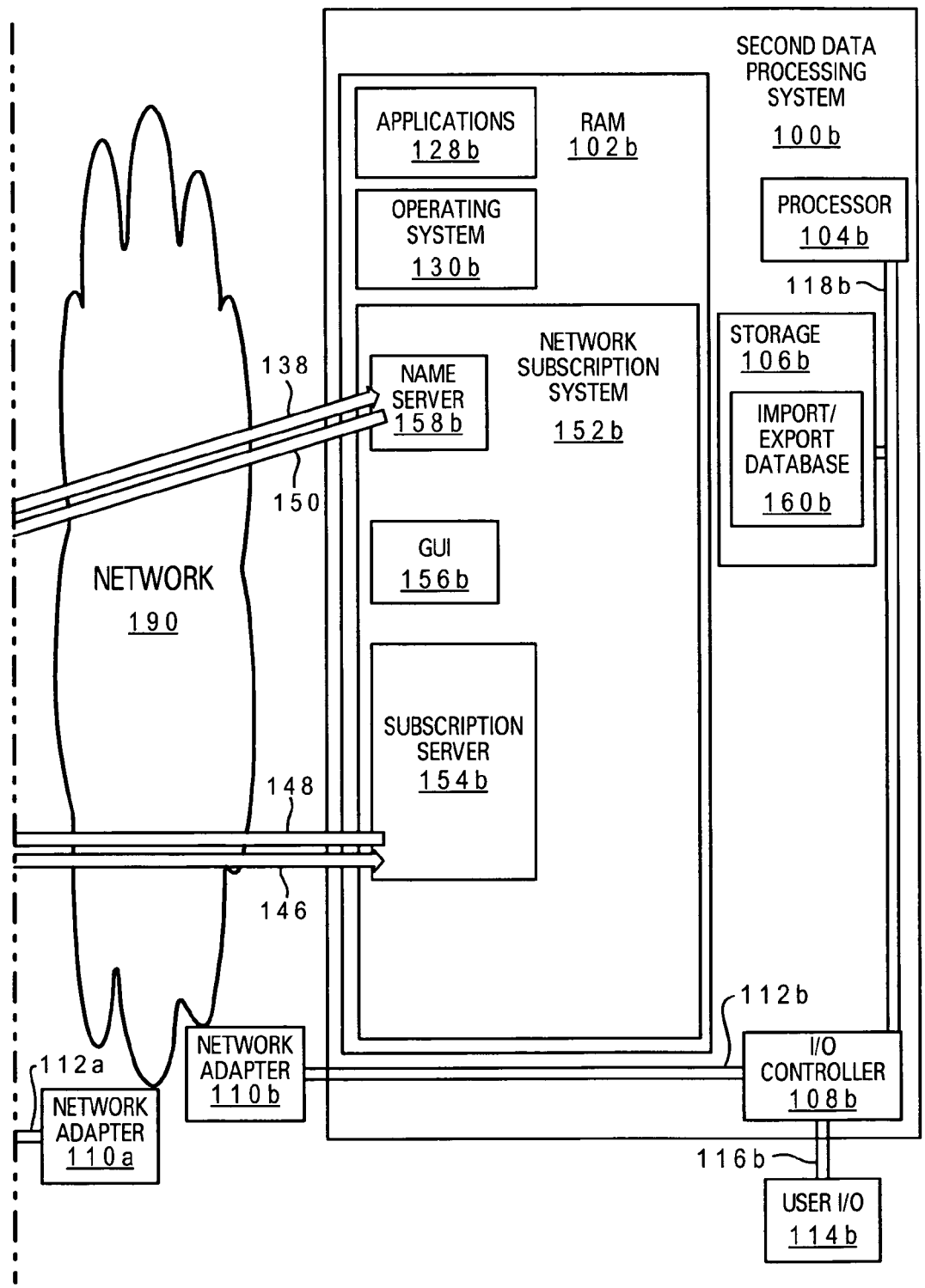

With reference now to the figures, and in particular with reference to FIG. 1, a block diagram of a network environment containing general-purpose data processing systems with which the present invention of a method, system and computer program product for maintaining federated name context bindings in a name space may be performed is depicted. Data processing systems 100a-100b contain processing storage units (e.g., RAM 102a-102b) and processors 104a-104b. Data processing systems 100a-100b also include persistent (i.e., non-volatile) storage 106a-106b such as hard disk drives or other direct-access storage devices, containing import/export databases 160a-160b. Input/Output (I/O) controllers 108a-108b provide connectivity to a network 190 through network adaptors 110a-110b connected to interface cables 112a-112b. I/O controller 108 also connects to user I/O devices 114a-114b such as keyboards, display devices, mice, or printers through wired or wireless links 116a-116b, such as cables or radio-frequency connections. System interconnect 118a-118b connect processors 104a-104b, RAM 102a-102b, storage 106a-106b, and I/O controllers 108a-108b.

Within RAM 102a-102b, data processing systems 100a-100b store several items of data and instructions while operating in accordance with a preferred embodiment of the present invention. These include network subscription systems 152a-152b for interaction with applications 128a-128b through the facilitation of operating systems 130a-130b. In the embodiment shown in FIG. 1, network subscription systems 152a-152b contain subscription servers 154a-154b, graphical user interfaces (GUIs) 156a-156b and name servers 158a-158b. Other applications 128a-128b and network subscription systems 152a-152b interface processors 104a-104b, RAM 102a-102b, storage 106a-106b, and I/O controllers 108a-108b through operating system 130a-130b. One skilled in the data processing arts will quickly realize that additional components of data processing systems 100a-100b may be added to or substituted for those shown without departing from the scope of the present invention. Additional servers, which are omitted for the sake of simplicity, will also exist in many implementations.

Name servers 158a-158b include the "local" name space (s) being administered and the "remote" name spaces which are being imported and/or exported. Subscription servers 154a-154b are used notify subscribing network subscription systems 152a-152b of events and are notified as a subscriber to other publishers of events of interest on those systems. Name servers 158a-158b notify subscription servers 154a-154b that a hosting data processing systems 100a-100b has been started or restarted. Where binding level export data is maintained in import/export databases 160a-160b, name servers 158a-158b also notify subscription servers 154a-154b on the hosting data processing systems 100a-100b of binding changes.

Subscription servers 154a-154b also contain the logic to maintain import/export databases 160a-160b, and to maintain federated bindings in the administered name spaces. In alternative embodiments, subscription servers 154a-154b could exist as multiple components, though they are represented as one component in the preferred embodiment for the sake of simplicity. Subscription servers 154a-154b contain application protocol interfaces (APIs) to allow them to edit, import and export data. Subscription servers 154a-154b interact with the other subscription servers 154a-154b. As a subscriber, subscription servers 154a-154b are notified by other subscription servers 154a-154b of imported name spaces. As a publisher, subscription servers 154a-154b notify other subscription servers 154a-154b of events. Subscription servers 154a-154b also read and write data from and to import/export databases 160a-160b. Finally, subscription servers 154a-154b perform bind and rebind operations on administered name spaces to keep federated bindings up-to-date.

In order to maintain federated naming context references as described in the present invention, certain data is maintained on some persistent media, such as storage 106a-106b. Data maintained to administer a name space consists of import data and export data. Continuing with the example described above, assume that Name Space A resides on first data processing system 100a and that Name Space B resides on second data processing system 100b. Import data in import/export database 160a on first data processing system 100a includes an entry for Name Space B. That entry for Name Space B in import/export database 160a would include the server address for the name server 158b and the address of subscription server 154b on second data processing system 100b. If Name Space B on second data processing system 100b is in turn a subscriber to Name Space A on first data processing system 100a, Name Space B's entry in import/export database 160a contains export data about Name Space A on first data processing system 100a. Export information includes a server address of subscription server 154b on second data processing system 100b. Details about which references Name Space B has into Name Space A are also included in the export data in import/export database 160a on first data processing system 100a, such as information required to identify those naming contexts. In a preferred embodiment, additional import/export data, such as last known availability status, which is more transient in nature, is not maintained in import/export database 160a on first data processing system 100a, though it can be in alternative embodiments. Second data processing system 100b hosting Name Space B would have similar import and export data in import/export database 160b. An example data structure housing data for import/export database 160a is provided below:

IMPORT DATA
  Table: Subscription Servers (list of foreign subscription servers)
    Column: Subscription Server ID (Assigned locally)
    Column: Subscription Server host name
    Column: Subscription Server port number
  Table: Foreign Name Servers
    Column: Subscription Server ID (reference into Subscription Servers table)
    Column: Name Server Bootstrap Host
    Column: Name Server Bootstrap Port
    Column: Foreign Name Server ID
  Table: Local Name Servers
    Column: Name Server Bootstrap Host
    Column: Name Server Bootstrap Port
    Column: Name Server ID
  Table: Bindings
    Column: Subscription Server ID (reference into Subscription Servers table)
    Column: Foreign Name Server ID (reference into Foreign Name Servers table)
    Column: Subscription ID (provided by foreign subscription server)
    Column: Local Name Server ID (reference into Local Name Servers table)
    Column: Foreign lookup name of federated naming context (relative to initial context)
    Column: Local binding name of federated naming context (relative to initial context)
EXPORT DATA
  Table: Subscription Servers (list of foreign subscription servers)
    Column: Subscription Server ID (Assigned locally)
    Column: Subscription Server host name
    Column: Subscription Server port number
  Table: Local Name Servers
    Column: Name Server Bootstrap Host
    Column: Name Server Bootstrap Port
    Column: Name Server ID
  Table: Subscriptions
    Column: Subscription ID (provided by foreign subscription server)
    Column: Local Name Server ID (reference into Local Name Servers table)
    Column: Subscription Server ID (reference into Subscription Servers table)
    Column: Local Name Server ID (reference into Local Name Servers table)
    Column: Local lookup name of naming context (relative to initial context)

GUIs 156a-156b are used to view and edit import and export data, and to allow a user to browse the local and remote name spaces. GUIs 156a-156b serve as the user's point of access to control activities of network subscription systems 152a-152b. More specifically, GUIs 156a-156b pass instructions in the form of APIs to subscription servers 154a-154b for reading and writing of all import and export data The APIs can operate locally or remotely. With local-only APIs, GUIs 156a-156b will run in the same process as subscription servers 154a-154b. With remote APIs, GUIs 156a-156b may run in a separate process, generating increased flexibility on data processing systems 100a-100b. Because GUIs 156a-156b also serve as name space browsers, GUIs 156a-156b interact with name servers 158a-158b for listed name spaces. Note that bind operations are not issued by GUIs 156a-156b directly, but through subscription servers 154a-154b when defining a federated binding.

The various components of the present invention communicate through a series of messages across network 190 or internally within data processing systems 100a-100b. When a user of first data processing system 100a starts GUI 156a, GUI 156a requests import data information from subscription server 154a by sending an import data request 120 to subscription server 154a. Subscription server 154a responds by sending an import data read 126 to import/export database 160a, to which import/export database 160a replies by sending import data in an import data return 128 to subscription server 154a. Subscription server 154a then takes the data returned in import data return 128 and transmits the data to GUI 156a as import data delivery 122.

GUI 156a displays icons, which will be discussed with respect to a visual representation in FIG. 2 for the initial naming context of each name space involved in federated bindings already reflected in import data received in import data delivery 122. When the user wants to browse name spaces associated with name servers 158a-158b, the user must provide name server address information for a name space if the name space is not already displayed on GUI 156a from existing import data. The user can, through GUI 156a, invoke name server 158a through an invocation request 132 to either obtain the initial context or issue a list operation on a naming context in the name space of name server 158a. Name server 158a responds to invocation request 132 by sending a list result 134 to GUI 156a. Similarly, a user can, through GUI 156a, invoke a remote name server 158b through a remote invocation request 138 to either obtain the initial context or issue a list operation on a naming context in the name space of name server 158b. Name server 158b responds to remote invocation request 138 by sending a remote list result 150 to GUI 156a. Remote invocation request 138 can be transmitted across an encrypted link using encryption protocols built into GUI 156a and name server 158b. Similar encryption is available for remote list result 150 and remote subscription return message 148, as well as remote subscription invocation message 146.

GUI 156a also allows a user to initiate creation of a federated context binding in the name space of name server 158a that resolves to a naming context in the name space of remote name server 158b. GUI 156a prompts user for an address of subscription server 154b such an address is not already available from import data already obtained in import data delivery 122. Federated binding invocation message 124 is sent by GUI 156a to invoke subscription server 154a to create a federated binding to a name space belonging to subscription server 154b. While various embodiments will handle the invocation of subscription server 154b in a variety of ways, a preferred embodiment will look up a subscription server reference from name server 158b under a predefined name. Alternative embodiments will employ external bootstrap servers that are used to obtain a reference to subscription server 154b. In remote subscription invocation message 146, subscription server 154a invokes subscription server 154b to subscribe to a naming context reference.

In remote subscription return message 148, subscription server 154b returns subscription ID and naming context reference to subscription server 154a. Subscription server 154a then writes the subscription ID and naming context reference from remote subscription return message 148 to import/export database 160a using remote subscription database write 130, and import/export database 160a replies to remote subscription database write 130 with a remote subscription database write success report 130. When subscription server 154a invokes name server 108a through name server invocation 140 to obtain an initial naming context, and name server 108a returns initial naming context 142, subscription server 154a executes bind operation on name server 108a, passing in the naming context reference 144 returned from subscription server 154b. Subscription server 154a then sends a binding success report 125 to GUI 156a. Subscription server 154a then sends a binding success report 125 to GUI 156a.

Figure 2:
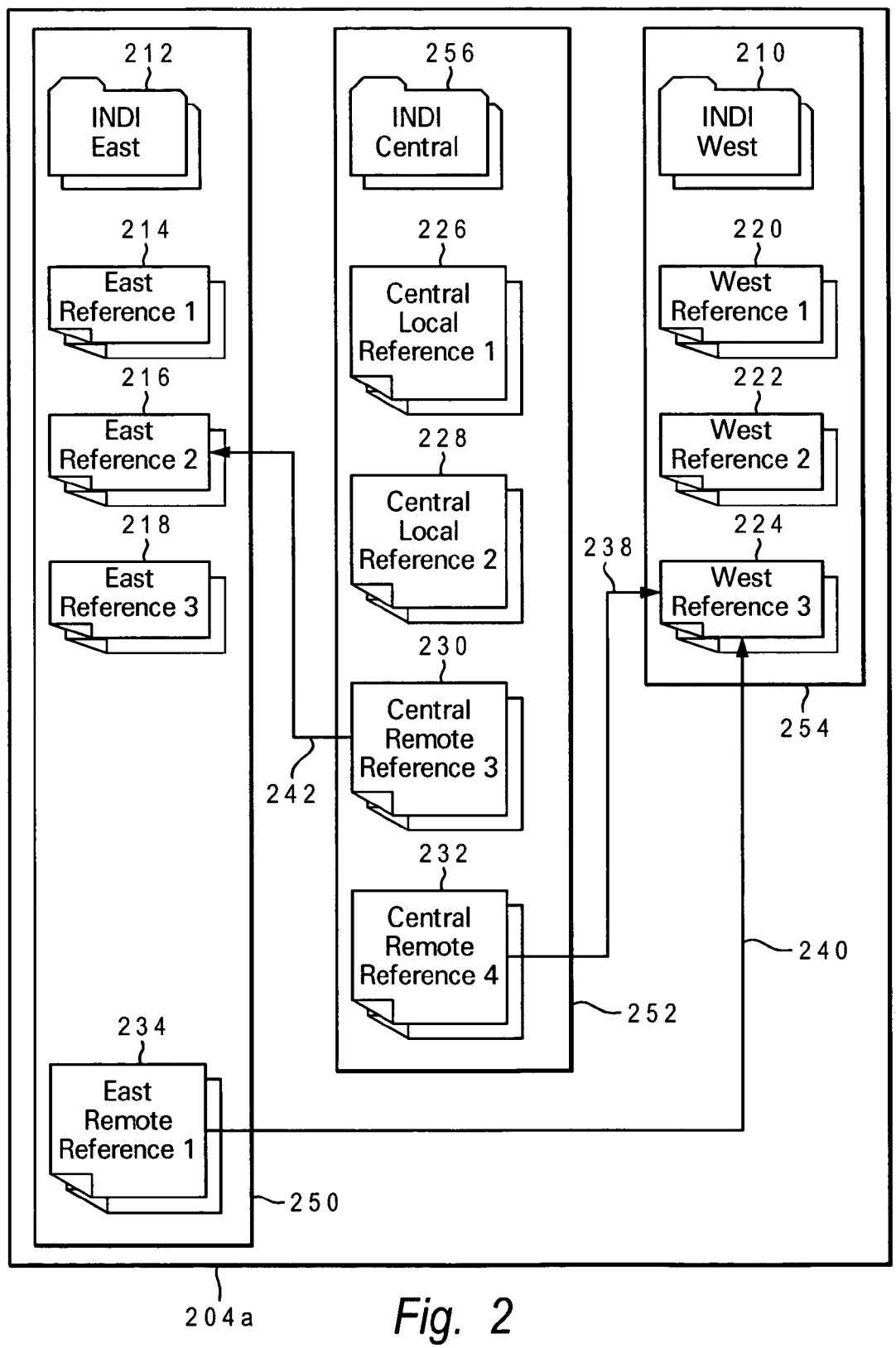
FIG. 2 depicts a graphical user interface for use with the present invention of a method, system and computer program product for maintaining federated name context bindings in a name space in accordance with a preferred embodiment of the present invention.

Turning now to FIG. 2, a graphical user interface for use with the present invention of a method, system and computer program product for maintaining federated name context bindings in a name space in accordance with a preferred embodiment of the present invention is depicted. GUI visual representation 204a is composed of visual association regions representing name spaces. First visual association region 252 includes name references 226-232 available to a user of GUI visual representation 204a in a local name space.

A first local reference 256 identifies network subscription system 200a. Central local reference 1 226 identifies a partition of name server 208a. Central local reference 228 identifies a second partition of name server 208a. GUI visual representation 204a supports remote references in first visual association region 252. Central remote reference 3 230 corresponds to east reference 2 216, which is shown in second visual association region 250. A binding indicator 242 graphically indicates the connection between central remote reference 3 230 in first visual association region 252 and east reference 2 216 in second visual association region 250. Similarly, central remote reference 4 232 corresponds to west reference 3 224 in third visual association region 254. A binding indicator 238 graphically indicates the association between central remote reference for 232 and west reference 3 224. As is shown in second visual association region 250, network subscription system 200b is indicated as JNDI east 212 with references 214-218, which are partitions of name server 208b. The use of the term 'JNDI' in naming indicates that JNDI east 212 conforms to the standards for the Java Naming and Directory Interface. Third visual association region 254 contains a server identifier 210, for a server not shown in FIG. 1, and partition indicator references 220-224.

In a preferred embodiment, GUI visual representation 204a will allow a user to create a reference on second network subscription system 200b to a reference on a third remote system. An example of such a binding is east remote reference 1 234 in second visual association region 250, which is bound to west reference 3 224. The binding between east remote reference 1 234 and west reference 3 224 is graphically indicated by binding indicator 240.

In a preferred embodiment of GUI visual representation 204a administering Name Space A, Name Space A on network subscription system 200a would be depicted as the local name space in second visual association region 252, and Name Space B on network subscription system 200b would be depicted as an imported name space in third visual association region 254. Drag and drop (or copy and paste) operations from third visual association region 254 to second visual association region 252 are used to create the federated binding indicated by binding indicator 238. Federated bindings can be imported in a similar manner from some other name space, depicted as an imported name space in the first visual association region 250. The name space could be a second name space hosted on network subscription system 200b or host some other network subscription system not shown.

Figure 4A:
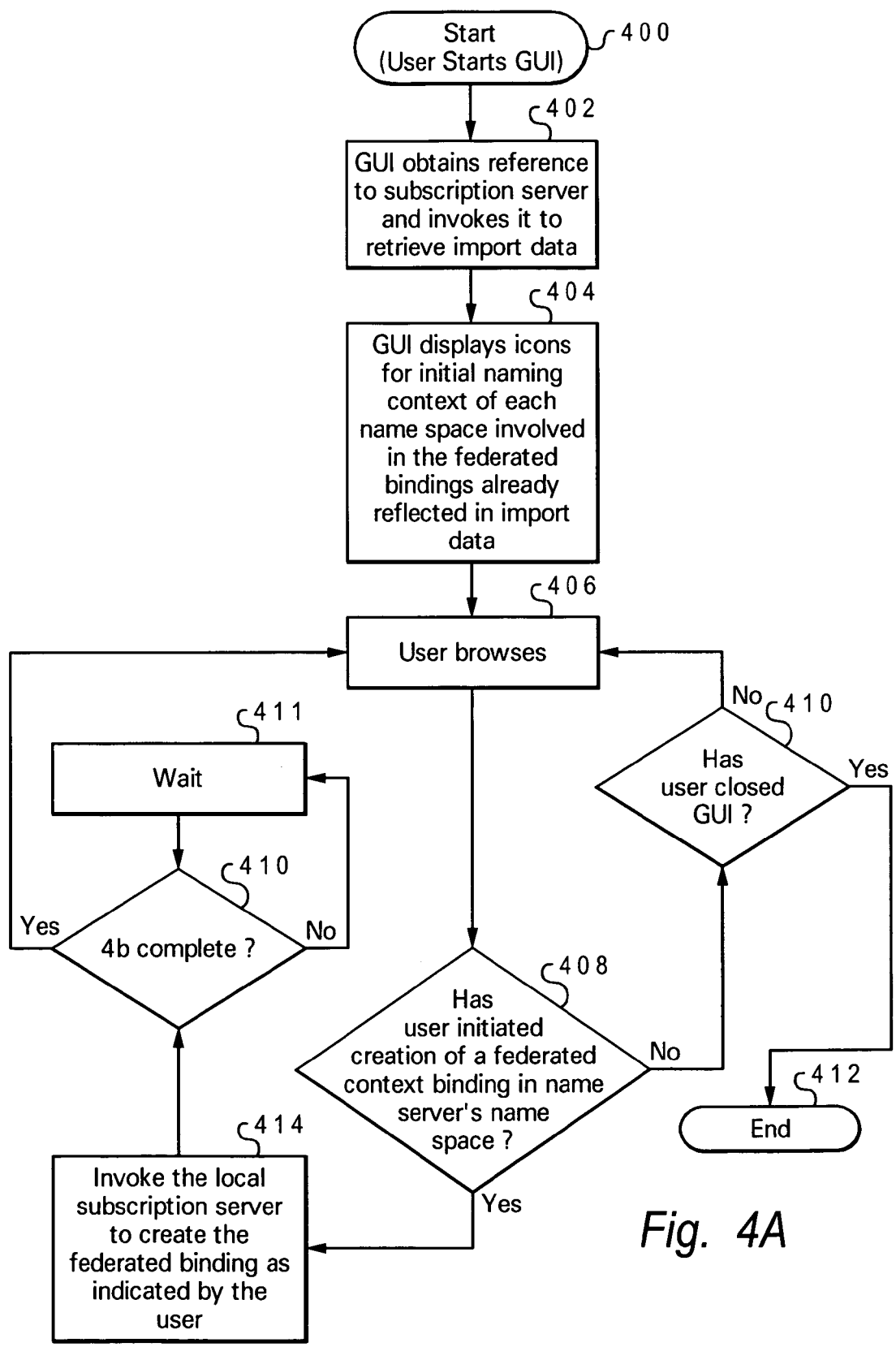
FIG. 4A illustrates a high-level logical flowchart of a process for using a GUI to browse name spaces in cooperating systems and issue a request to create a federating binding in a name space in one system, which resolves to a naming context in a name space in another system, in accordance with a preferred embodiment of the present invention.

Referring now to FIG. 4A, a high-level logical flowchart of a process for using a GUI to browse name spaces in cooperating systems and issue a request to create a federating binding in a name space in one system, which resolves to a naming context in a name space in another system, in accordance with a preferred embodiment of the present invention is illustrated. The process starts at step 400, when a user starts GUI 156a. The process then moves to step 402, which illustrates GUI 156a obtaining a reference to subscription server 154a and invoking the subscription server 154a to retrieve import data. The process next proceeds to step 404. At step 404, GUI 156a displays in GUI visual representation 204a icons for the initial naming context of each name space involved in the federated bindings already reflected in import data from import/export database 160a. The process then moves to step 406, which illustrates a user browsing GUI visual representation 204a. The process next proceeds to step 408.

At step 408, GUI 156a determines whether the user has initiated creation of a federated context binding in a name space name server for a name server 158a, for example, by drag-and-drop use of GUI visual representation 204a. If the user has not initiated creation of a federated context binding in a name space for a name server 158a-158b, then the process moves to step 410, which illustrates GUI 204a determining whether the user has closed the GUI visual representation 204a. If GUI 156a determines that the user has not closed GUI visual representation 204a, then the process returns to step 406. If GUI 156a determines that the user has closed GUI visual representation 204a, then the process ends at step 412.

Figure 4B:
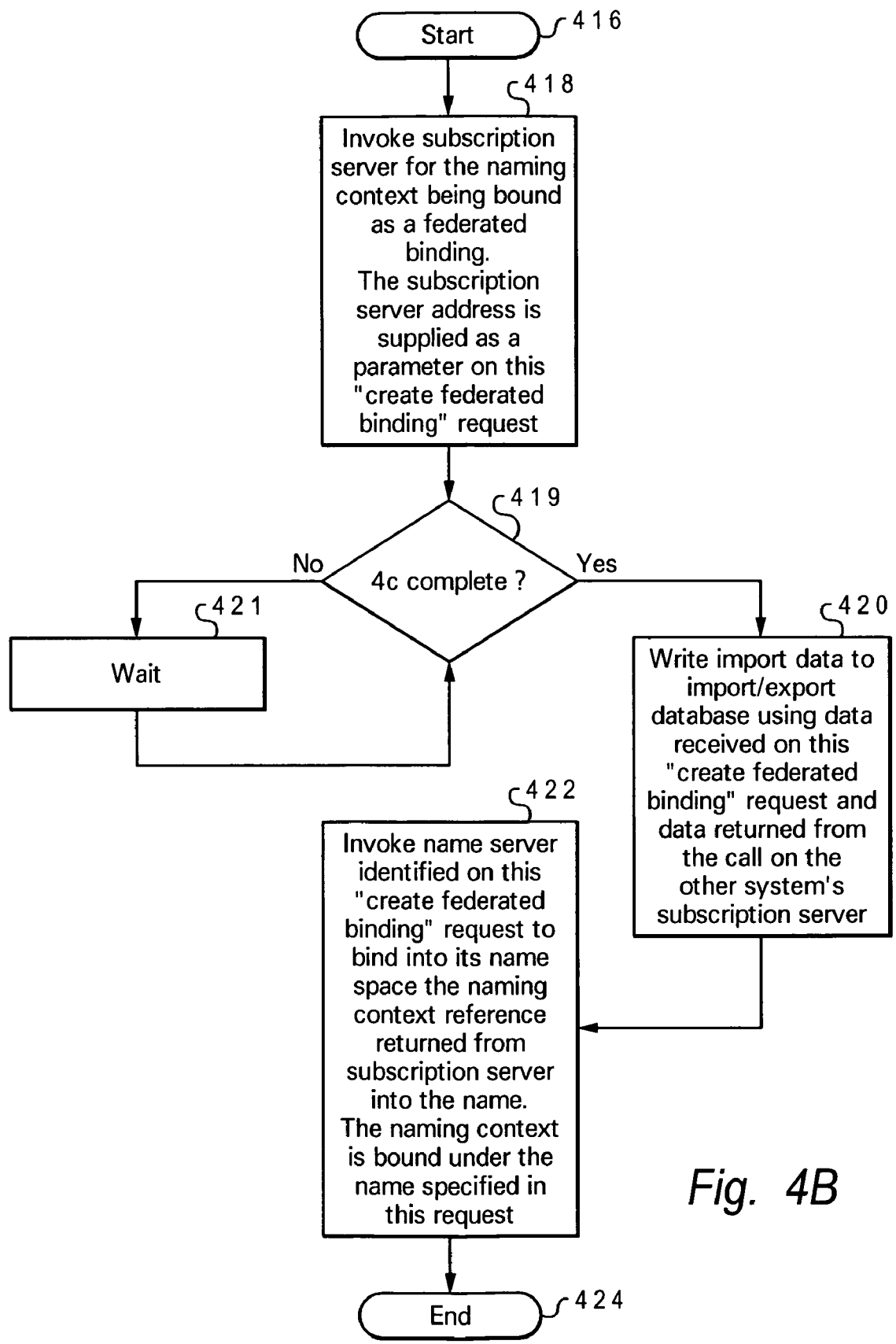
FIG. 4B depicts a high-level logical flowchart of a process for importing a naming context reference from another system in the form of a subscription for the purposes of binding the naming context reference into a name space in the local system in accordance with a preferred embodiment of the present invention.

Returning to step 408, if GUI 156a determines that the user has initiated creation of a federated context binding in a name space associated with a name server 158a-158b. Then the process moves to step 414, which illustrates GUI 156a invoking local subscription server 202a to create a federated binding as indicated by the user. Step 414 causes initiation of the process of FIG. 4B at step 416. The process then proceeds to step 410, which illustrates GUI 156a determining whether the process of FIG. 4B is complete. If GUI 156a determines that the process of FIG. 4B is not complete, then the process moves to step 411 and waits. The process then returns to step 410. If GUI 156a determines that the process of FIG. 4B is complete, then the process returns to step 406.

Figure 4C:
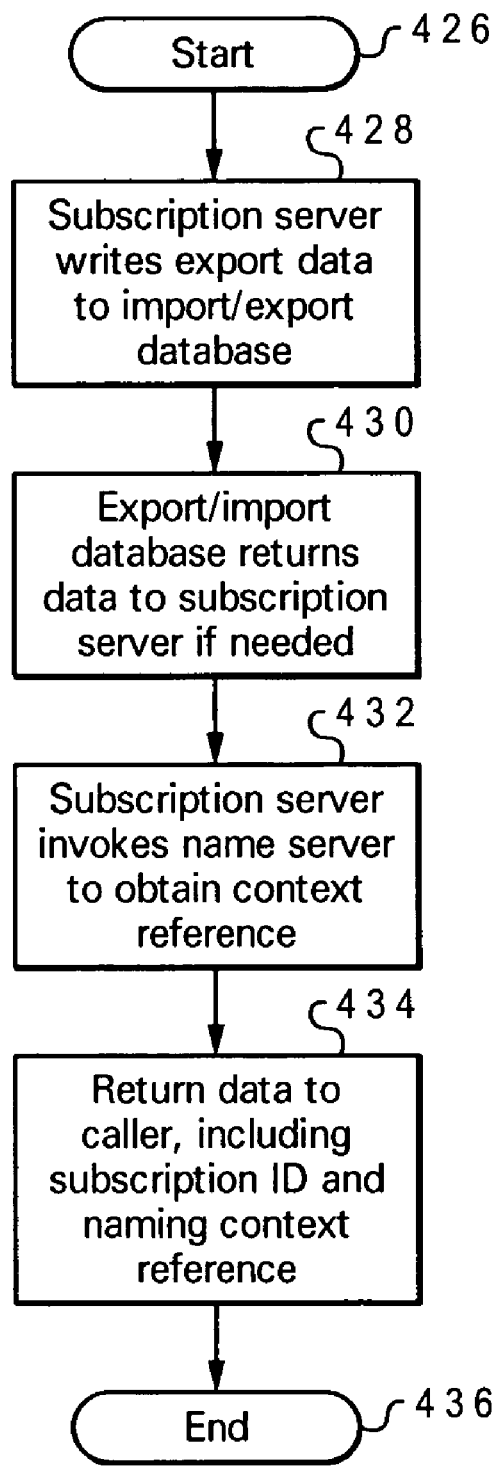
FIG. 4C illustrates a high-level logical flowchart of a process for exporting a naming context reference through a system's handling of a request for a subscription to a naming context from a name space in that system in accordance with a preferred embodiment of the present invention.

Turning now to FIG. 4B, a high-level logical flowchart of a process for importing a naming context reference from another system in the form of a subscription for the purposes of binding the naming context reference into a name space in the local system in accordance with a preferred embodiment of the present invention is depicted. The process starts at step 416 and then moves to step 418, which depicts subscription server 154a invoking subscription server 154b for the naming context being bound as a federated binding. A subscription server address is supplied as a parameter by GUI 156a. Step 418 causes the initiation of the process shown in FIG. 4C, which starts at step 426, below. The process of FIG. 4B then moves to step 419, which depicts subscription server 154a determining whether the process of FIG. 4C is complete. If the process of FIG. 4C is not complete then the process of FIG. 4B moves to step 421, where subscription server 154a waits. The process then returns to 419. At step 419, if the process of FIG. 4C is complete, then the process of FIG. 4B moves to step 420, which depicts subscription server 154a writing import data to import/export database using data supplied as parameters from GUI 156a and data returned from subscription server 154b upon termination of the process in FIG. 4C. The process then moves to step 422, which depicts subscription server 154a invoking the name server identified by GUI 156a as parameter data to bind into its name space the naming context reference returned from subscription server 154b upon termination of the process of FIG. 4C. The naming context is bound under the name specified by GUI 156a as parameter data. The process then ends at step 424.

Referring now to FIG. 4C, a high-level logical flowchart of a process for exporting a naming context reference, through a system's handling of a request for a subscription to a naming context from a name space in that system in accordance with a preferred embodiment of the present invention is illustrated. The process starts at step 426. The process then moves to step 428, which depicts subscription server 154b writing export data to import/export database 160b. The process next passes to step 430. At step 430, import/export database 160b returns data to subscription server 154b, if needed. The process then moves to step 432. which depicts subscription server 154b invoking name server 158b to obtain a context reference. The process then moves to step 434. At step 434, subscription server 154b returns data to the caller, subscription server 154a, including a subscription ID and naming context reference. The process then ends at step 436.

Figure 3A:
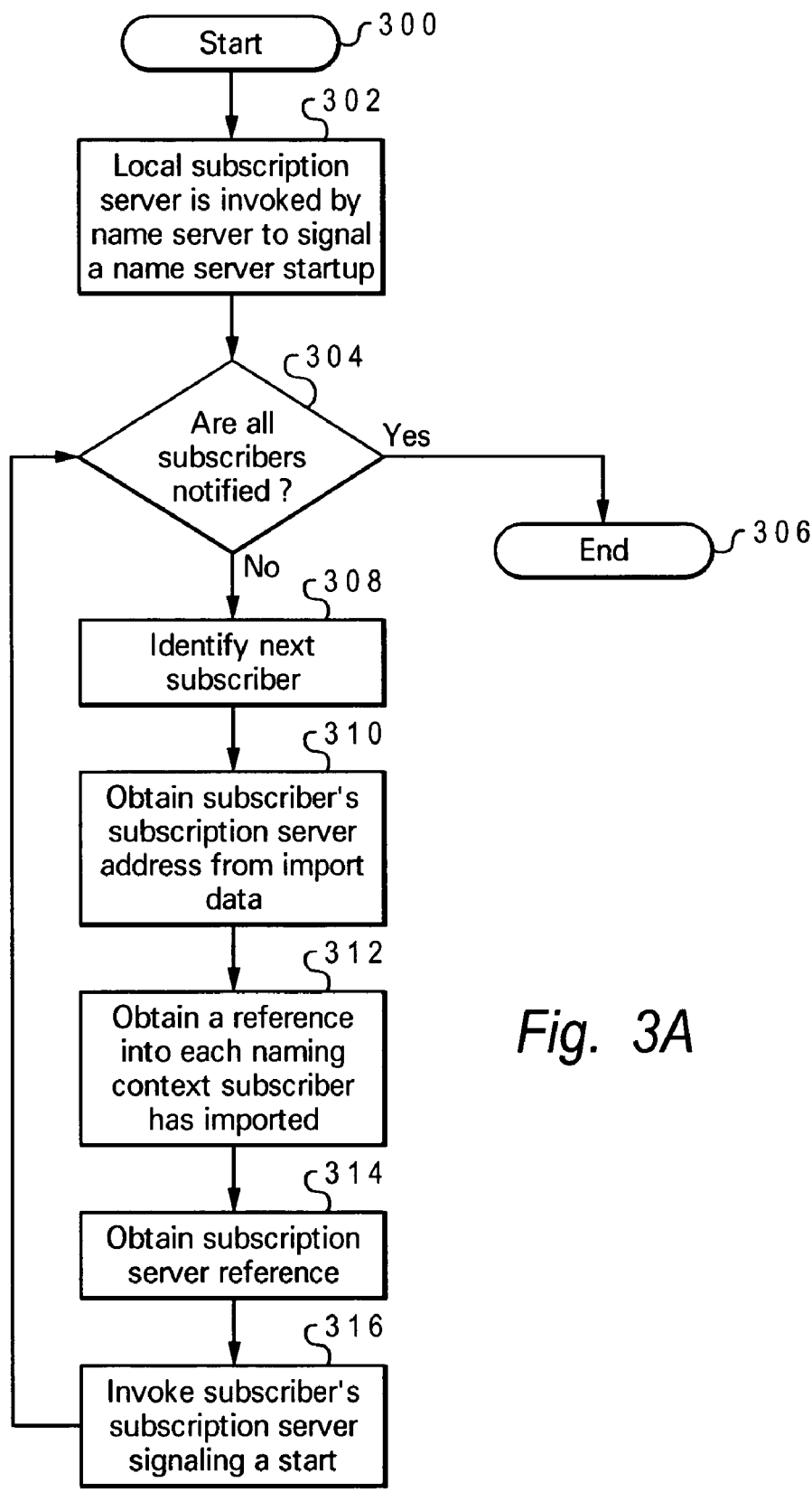
FIG. 3A illustrates a high-level logical flowchart of a process for sending notifications to naming context subscribers upon startup of the name server hosting a naming context in accordance with a preferred embodiment of the present invention.

Referring now to FIG. 3A, a high-level logical flowchart of a process for sending notifications to naming context subscribers upon startup of the name server hosting a name space in accordance with a preferred embodiment of the present invention is illustrated.

The process starts at step 300 and then moves to step 302, which indicates local subscription server 154b being invoked by name server 158b to signal a name server 158b startup. The process next moves to step 304. At step 304, subscription server 154b determines whether all subscribers are notified. If subscription server 154b determines that all subscribers are notified, then the process ends at step 306. If subscription server 154b does not determine that all subscribers are notified, then the process moves to step 308, which depicts subscription server 154b identifying a next subscriber for notification. The process then proceeds to step 310.

At step 310, subscription server 154b obtains the subscription server address for subscription server 154a from import data in import/export database 160b. The process next proceeds to step 312. At step 312, subscription server 154b obtains a reference into each naming context subscription server 154a has imported. The process then proceeds to step 314. At step 314, subscription server 154b obtains a subscription server reference. The process then moves to step 316, which portrays subscription server 154b invoking subscription server 154a, notifying it through parameter data that a name server start has occurred. Also included in the parameter data are references to all naming context references hosted by name server 158b that subscription server 154a has imported. Since a start of name server 158b affects all its hosted naming context references exported to subscribers, sending out a batched notification to a subscriber is preferable to invoking a subscriber for each exported naming context. The global notification sent to subscription server 154a contains all naming context references from the hosting name server 158b that have been exported to subscription server 154a. The process then returns to step 304.

Figure 3B:
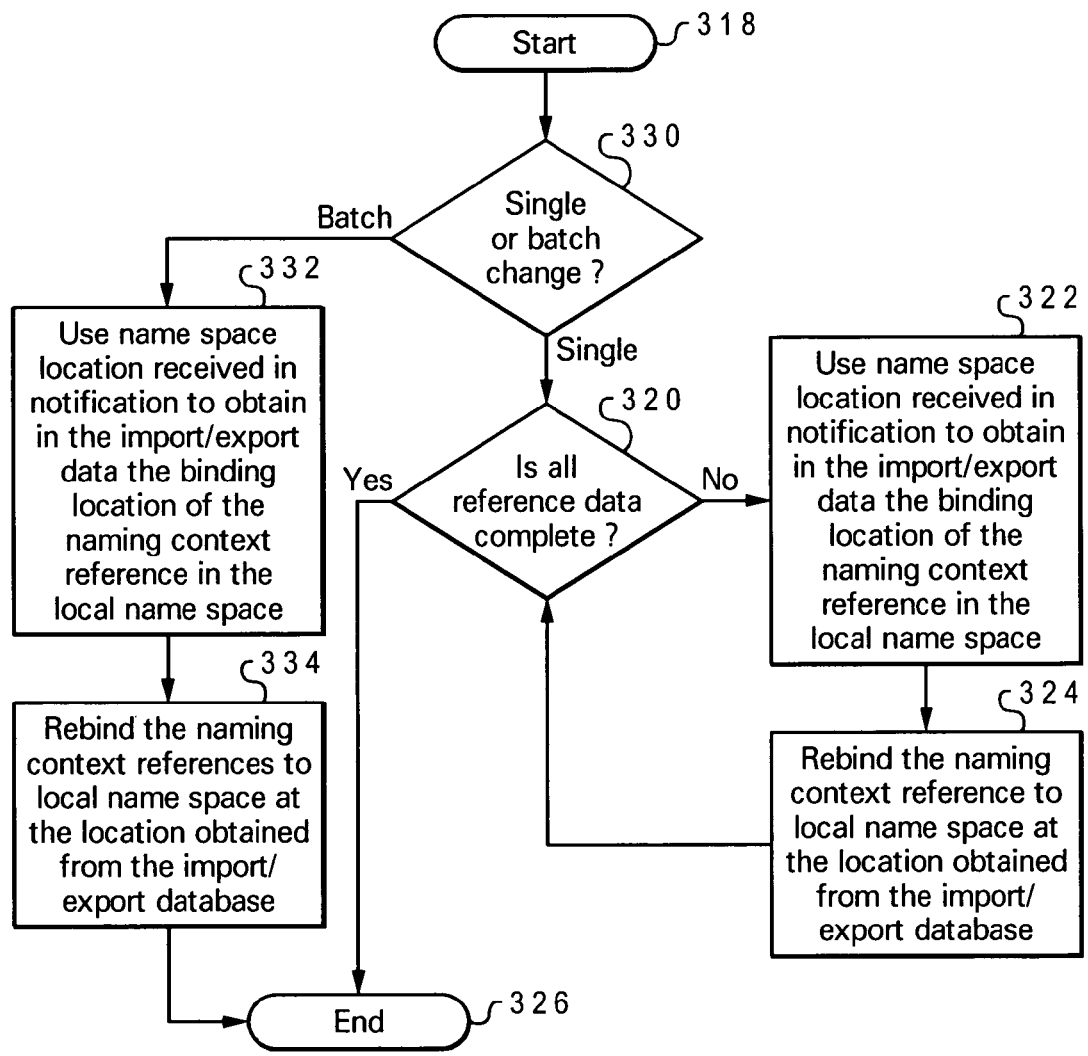
FIG. 3B depicts a high-level logical flowchart of a process for rebinding a naming context imported through a subscription in response to a notification from the hosting system that the naming context reference must be refreshed in accordance with a preferred embodiment of the present invention.

Turning now to FIG. 3B, a high-level logical flowchart of a process for rebinding a naming context imported through a subscription in response to a notification from the hosting system that the naming context reference must be refreshed in accordance with a preferred embodiment of the present invention is depicted. The process starts at step 318. The process then proceeds to step 330, which depicts subscription server 154a determining whether a single or a batched reference change notification was received. If subscription server 154a determines that a single reference change notification has been received, then the process moves to step 332. Step 332 illustrates subscription server 154a using the name space location received in a notification to obtain from the import/export data the location of the federated binding in the local name space. The process then moves to step 334. At step 334, subscription server 154a rebinds the naming context reference received in the notification to the local name space. The process then ends at step 326.

Returning to step 330, if subscription server 154a determines that a batched reference change notification was received, then the process next moves to step 320 to iterate through the list of reference data contained in the notification. Step 320 depicts subscription server 154a determining whether all reference data has been processed. If all reference data is complete, then the process ends at step 326. If all reference data is not complete, then the process proceeds to step 322, which illustrates subscription server 154a using a name space location received in a notification to obtain from the import/export data the location of the federated binding in the local name space. The process then moves to step 324. At step 324, subscription server 154a invokes name server 158a to rebind to the local name space the naming context reference corresponding to step 322 received in the notification. The process then returns to step 320.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method, within a first computer system including at least a hardware processor and a hardware storage, for maintaining federated name context bindings in a name space, said method comprising:

the first computer system binding, with a durable subscription, a first reference within a first name space of the first computer system to a second name space on a second computer system including at least a hardware processor and hardware storage, wherein said step of binding includes:

the first computer system transmitting to said second computer system a data record identifying a naming context in said second computer system associated with said first reference on said first computer system; and creating an entry in a database in the hardware storage of the first computer system containing a naming context reference returned by the second computer system;

administering with a graphical user interface of said first computer system said binding of said first reference to said second name space, said administering including:

presenting a plurality of graphical objects each representing a respective one of a plurality of namespaces including the first name space and the second name space;

presenting a plurality of graphical objects each representing a respective one of a plurality of name references distributed among the plurality of namespaces and graphically indicating associations between the plurality of name references and the plurality of name spaces;

presenting a plurality of graphical binding indicators indicating a plurality bindings between the plurality of name references, said plurality of graphical binding indicators including a first graphical binding indicator indicating the binding between the first reference within the first name space and the second name space; and creating at least one of the plurality of graphical binding indicators and an underlying one of the plurality of bindings via a graphical manipulation in the graphical user interface;

the first computer system establishing a durable subscription at said second computer system for said binding utilizing communication with said second computer system over a network;

based upon the durable subscription, the first computer system automatically receiving notification of a change affecting said binding from said second computer system; and in response to the notification, the first computer system rebinding said first reference in said first name space, wherein said rebinding further comprises updating the entry in the database to reflect rebinding to a third name space on said second system all references in said first name space on said first computer system that are bound to said second computer system.

2. The method of claim 1, wherein said step of binding with said durable subscription said first computer system with said first name space containing said first reference to said second name space on said second computer system further comprises binding with said durable subscription over an encrypted link said first computer system with said first name space containing said first reference to said second name space on said second computer system.

3. The method of claim 1, wherein said rebinding step further comprises rebinding to a third name space on said second computer system an identified list of references on said first computer system received from said second computer system.

4. The method of claim 1, wherein said step of binding, with said durable subscription, said first reference further comprises transmitting to said second computer system a data record identifying a naming context in said second computer system associated with said first reference on said first computer system.

5. The method of claim 1, wherein said step of binding with said durable subscription said first computer system with said first name space containing said first reference to said second name space on a second computer system further comprises storing one or more details of said durable subscription on a persistent medium accessible to said second computer system.

6. The method of claim 1, wherein said step of establishing further comprises transmitting a first server address, a subscription server address, and a reference identifier for said first reference.

7. A computer system that maintains federated name context bindings in a name space, said computer system comprising:

a processor;

a network interface coupled to the processor to support communication over a network with another computer system;

storage coupled to and accessible by the hardware processor;

a database within the storage;

program code within the storage and executable by the processor to maintain federated name context bindings, wherein the program code when executed by the processor causes the computer system to:

bind, with a durable subscription, a first reference within a first name space of the computer system to a second name space on said another computer system by transmitting to said second computer system a data record identifying a naming context in said second computer system associated with said first reference on said first computer system and by creating an entry in the database containing a naming context reference returned by the second computer system;

administer with a graphical user interface said binding of said first reference to said second name space, wherein administration of the binding includes:

presenting a plurality of graphical objects each representing a respective one of a plurality of namespaces including the first name space and the second name space;

presenting a plurality of graphical objects each representing a respective one of a plurality of name references distributed among the plurality of namespaces and graphically indicating associations between the plurality of name references and the plurality of name spaces;

presenting a plurality of graphical binding indicators indicating a plurality bindings between the plurality of name references, said plurality of graphical binding indicators including a first graphical binding indicator indicating the binding between the first reference within the first name space and the second name space; and creating at least one of the plurality of graphical binding indicators and an underlying one of the plurality of bindings via a graphical manipulation in the graphical user interface;

establish a durable subscription at said another computer system for said binding utilizing communication with said second computer system over the network;

automatically receive notification of a change affecting said binding from said second computer system based upon the durable subscription; and in response to the notification, rebind the first reference in said first name space, wherein rebinding the first reference includes updating the entry in the database to reflect rebinding to a third name space on said second system all references in said first name space on said first computer system that are bound to said second computer system.

8. The computer system of claim 7, wherein the program code binds the first reference in the first name space with the second name space over an encrypted link between the computer system and said another computer system.

9. The computer system of claim 7, wherein said program code rebinds to a third name space on said another computer system an identified list of references on said first computer system received from said second computer system.

10. The computer system of claim 7, wherein said program code, to bind the first reference with said durable subscription, transmits to the another computer system a data record identifying a naming context in said another computer system associated with said first reference on said first computer system.

11. The computer system of claim 7, wherein said program code, to establish the durable subscription at said another computer system, transmits to said another computer system a first server address, a subscription server address, and a reference identifier for said first reference.

12. A program product for maintaining federated name context bindings in a name space, said program product comprising:

a tangible computer readable data storage medium;

program code within the tangible computer readable data storage medium and executable by the computer system to maintain federated name context bindings, wherein the program code when executed by a computer system causes the computer system to:

bind, with a durable subscription, a first reference within a first name space of the computer system to a second name space on another computer system by transmitting to said second computer system a data record identifying a naming context in said second computer system associated with said first reference on said first computer system and by creating an entry in the database containing a naming context reference returned by the second computer system;

administer with a graphical user interface said binding of said first reference to said second name space, wherein administration of the binding includes:

presenting a plurality of graphical objects each representing a respective one of a plurality of namespaces including the first name space and the second name space;

presenting a plurality of graphical objects each representing a respective one of a plurality of name references distributed among the plurality of namespaces and graphically indicating associations between the plurality of name references and the plurality of name spaces;

presenting a plurality of graphical binding indicators indicating a plurality bindings between the plurality of name references, said plurality of graphical binding indicators including a first graphical binding indicator indicating the binding between the first reference within the first name space and the second name space; and creating at least one of the plurality of graphical binding indicators and an underlying one of the plurality of bindings via a graphical manipulation in the graphical user interface;

establish a durable subscription at said another computer system for said binding utilizing communication with said second computer system over the network;

automatically receive notification of a change affecting said binding from said second computer system based upon the durable subscription; and in response to the notification, rebind the first reference in said first name space, wherein rebinding the first reference includes updating the entry in the database to reflect rebinding to a third name space on said second system all references in said first name space on said first computer system that are bound to said second computer system.

13. The program product of claim 12, wherein the program code binds the first reference in the first name space with the second name space over an encrypted link between the computer system and said another computer system.

14. The program product of claim 12, wherein said program code rebinds to a third name space on said another computer system an identified list of references on said first computer system received from said second computer system.

15. The program product of claim 12, wherein said program code, to bind the first reference with said durable subscription, transmits to the another computer system a data record identifying a naming context in said another computer system associated with said first reference on said first computer system.

16. The program product of claim 12, wherein said program code, to establish the durable subscription at said another computer system, transmits to said another computer system a first server address, a subscription server address, and a reference identifier for said first reference.

* * * * *

UNITED STATES PATENT AND TRADEMARK OFFICE
CERTIFICATE OF CORRECTION

PATENT NO. : 7,603,359 B2
APPLICATION NO. : 11/333604
DATED : October 13, 2009
INVENTOR(S) : Bhogal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Fifth Day of October, 2010

David J. Kappos
*Director of the United States Patent and Trademark Office*